United States Patent
Berggren et al.

(10) Patent No.: US 9,578,576 B2
(45) Date of Patent: Feb. 21, 2017

(54) CONTROL OF OFFLOADING FOR DEVICE-TO-DEVICE TRAFFIC IN A CELLULAR NETWORK

(71) Applicant: SONY CORPORATION, Tokyo (JP)

(72) Inventors: Anders Berggren, Lund (SE); Lars Nord, Lund (SE); Brian Alexander Martin, Surrey (GB)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 14/328,891

(22) Filed: Jul. 11, 2014

(65) Prior Publication Data
US 2016/0014663 A1 Jan. 14, 2016

(51) Int. Cl.
- *H04W 36/00* (2009.01)
- *H04W 36/22* (2009.01)
- *H04W 76/02* (2009.01)
- *H04W 88/06* (2009.01)

(52) U.S. Cl.
CPC .......... *H04W 36/22* (2013.01); *H04W 76/023* (2013.01); *H04W 76/026* (2013.01); *H04W 88/06* (2013.01)

(58) Field of Classification Search
CPC .. H04W 76/023; H04W 76/043; H04W 72/08; H04W 36/22; H04W 76/026; H04W 88/06
USPC ........................................................ 455/436
See application file for complete search history.

(56) References Cited

U.S. PATENT DOCUMENTS

| | | | |
|---|---|---|---|
| 2008/0305744 A1 | 12/2008 | Furuskar et al. | |
| 2012/0243431 A1* | 9/2012 | Chen | H04W 72/0406 370/252 |
| 2012/0265913 A1 | 10/2012 | Suumaki et al. | |
| 2013/0287012 A1 | 10/2013 | Pragada et al. | |
| 2014/0206322 A1* | 7/2014 | Dimou | H04W 4/005 455/414.1 |
| 2014/0243039 A1* | 8/2014 | Schmidt | H04W 76/023 455/552.1 |
| 2014/0243040 A1* | 8/2014 | Bienas | H04W 36/30 455/552.1 |

(Continued)

FOREIGN PATENT DOCUMENTS

EP 2665325 A1 11/2013

OTHER PUBLICATIONS

3GPP TR 23.703, V12.0.0 (Feb. 2014), 3$^{rd}$ Generation Project; Technical Specification Group Services and System Aspects; Study on architecture enhancements to support Proximity-based Services (ProSe) (Release 12), 324 pages.

(Continued)

*Primary Examiner* — Timothy Pham
(74) *Attorney, Agent, or Firm* — Tucker Ellis LLP

(57) ABSTRACT

In a cellular network based on a cellular radio technology, a communication device sends a request for D2D communication to the cellular network. Further, the communication device receives a response to the request. The response indicates that an alternative radio technology is to be utilized for the D2D communication. The communication device then establishes the D2D communication on the basis of the alternative radio technology.

20 Claims, 5 Drawing Sheets

(56) References Cited

U.S. PATENT DOCUMENTS

| | | | |
|---|---|---|---|
| 2015/0133133 A1* | 5/2015 | Isobe ................. | H04W 68/005 |
| | | | 455/450 |
| 2015/0208401 A1* | 7/2015 | Lu ....................... | H04W 72/082 |
| | | | 455/452.1 |
| 2016/0183076 A1* | 6/2016 | Bagayoko ............. | H04W 8/005 |
| | | | 370/329 |

OTHER PUBLICATIONS

PCT International Search Report and Written Opinion issued for corresponding application No. PCT/EP2015/050327, mailed Jun. 2, 2015, 13 pages.

* cited by examiner

CONTROL OF OFFLOADING FOR DEVICE-TO-DEVICE TRAFFIC IN A CELLULAR NETWORK

FIELD OF THE INVENTION

The present invention relates to methods of controlling device-to-device (D2D) communication in a cellular network and to corresponding devices.

BACKGROUND OF THE INVENTION

In the LTE (Long Term Evolution) technology specified by 3GPP ($3^{rd}$ generation partnership project), also D2D communication using radio resources managed by the cellular network is considered, as for example discussed in 3GPP TR 23.703 V12.0.0 (2014-02). In the case of LTE D2D communication, a user equipment (UE) communicates with another UE directly using LTE radio resources, rather than through infrastructure of the LTE network.

However, in some situations the LTE network may be heavily loaded with traffic so that only limited LTE radio resources can be allocated to D2D communication.

Accordingly, there is a need for techniques which allow for efficiently controlling D2D communication in a cellular network.

SUMMARY OF THE INVENTION

According to an embodiment of the invention, a communication device is provided. The communication device comprises a first radio interface providing connectivity to a cellular network based on a cellular radio technology and a second radio interface providing connectivity based on an alternative radio technology. Further, the communication device comprises a processor. The processor is configured to send, to the cellular network, a request for D2D communication. The request can for example be a request for radio resources of the cellular radio technology, to be used for the D2D communication. Further, the request can be a request for authorization of the D2D communication. Further, the processor is configured to receive a response to the request. The response indicates that the alternative radio technology is to be utilized for the D2D communication. Still further, the processor is configured to establish the D2D communication on the basis of the alternative radio technology. The response may also indicate radio resources of the alternative radio technology, e.g., one or more channels or carriers.

According to an embodiment, the processor is configured to select radio resources from radio resources of the alternative radio technology indicated in the response and to establish the D2D communication on the selected radio resources.

According to an embodiment, the processor is configured to evaluate one or more criteria concerning the alternative radio technology and depending on the evaluation, decide whether to perform establishing of the D2D communication on the basis of the alternative radio technology. These criteria may for example be based on radio resources of the alternative radio technology, e.g., whether the radio resources are suitable for establishing the D2D communication. The evaluated radio resources of the alternative radio technology may be indicated in the response. Alternatively or in addition, the criteria may be based on one or more capabilities of the communication device, e.g., whether the communication device is capable of utilizing the certain radio resources of the alternative radio technology. Alternatively or in addition, the criteria may be based on measurements with respect to at least one of the cellular radio technology and the alternative radio technology, e.g., a comparison of channel qualities which are achievable with the cellular radio technology and the alternative radio technology, a comparison of received signal strength of the cellular radio technology or the alternative radio technology against an absolute threshold, or the determination of a pathloss between communication devices based on measurements of cellular radio technology or the alternative radio technology.

According to an embodiment, the request may also indicate a preference for the alternative radio technology. For example, the processor may be configured to determine such preference based on the above mentioned criteria.

According to an embodiment, the processor is configured to provide a measurement report concerning the alternative radio technology to the cellular network.

According to an embodiment, the processor may be configured to establish temporary D2D communication based on the cellular radio technology with a further communication device. For establishing the temporary D2D communication, the cellular network may temporarily assign radio resources of the cellular radio technology. Further, the processor may be configured to negotiate, based on this temporary D2D communication, parameters of the alternative radio technology with the further communication device and, on the basis of the negotiated parameters, establish the D2D communication based on the alternative radio technology.

According to a further embodiment of the invention, a node of a cellular network is provided. The node comprises an interface providing connectivity to a communication device and a processor. The processor is configured to receive, from the communication device, a request for D2D communication. Further, the processor is configured to send a response to the request. The response indicates that an alternative radio technology is to be utilized for the D2D communication. The response may further indicate radio resources of the alternative radio technology.

According to an embodiment, the processor is configured to receive a measurement report concerning the alternative radio technology from the communication device and to perform an evaluation of the measurement report. Further, the processor may be configured to send the response depending on the evaluation.

According to an embodiment, the processor is configured to send the response depending on a location of the communication device.

According to an embodiment, the processor is configured to send the response depending on capabilities of the communication device.

According to an embodiment, the processor is configured to send the response depending on a load of the cellular network.

According to an embodiment, the processor is configured to send the response depending on a preference for or availability of the alternative radio technology indicated in the request.

According to a further embodiment of the invention, a method is provided. According to the method, a communication device sends, to a cellular network based on a cellular radio technology, a request for D2D communication. Further, the communication device receives a response to the request. The response indicates that an alternative radio technology is to be utilized for the D2D communication. The communication device then establishes the D2D communication on the basis of the alternative radio technology. The response may indicate radio resources of the alternative radio technology.

According to an embodiment, the communication device selects radio resources from radio resources of the alternative radio technology indicated in the response and establishes the D2D communication on the selected radio resources.

According to an embodiment, the communication device evaluates one or more criteria concerning the alternative radio technology and, depending on the evaluation, the communication device decides whether to perform establishing of the D2D communication on the basis of the alternative radio technology. These criteria may for example be based on radio resources of the alternative radio technology, e.g., whether the radio resources are suitable for establishing the D2D communication. The evaluated radio resources of the alternative radio technology may be indicated in the response. Alternatively or in addition, the criteria may comprise one or more capabilities of the communication device, e.g., whether the communication device is capable of utilizing the certain radio resources of the alternative radio technology. Alternatively or in addition, the criteria may be based on measurements with respect to at least one of the cellular radio technology and the alternative radio technology, e.g., a comparison of channel qualities which are achievable with the cellular radio technology and the alternative radio technology, a comparison of received signal strength of the cellular radio technology or the alternative radio technology against an absolute threshold, or the determination of a pathloss between communication devices based on measurements of cellular radio technology or the alternative radio technology.

According to an embodiment, the request may also indicate a preference for the alternative radio technology. For example, the communication device may determine such preference or availability based on the above mentioned criteria.

According to an embodiment, the communication device provides a measurement report concerning the alternative radio technology to the cellular network.

According to an embodiment, the communication device may establish temporary D2D communication based on the cellular radio technology with a further communication device. For establishing the temporary D2D communication, the cellular network may temporarily assign radio resources of the cellular radio technology. Based on this temporary D2D communication, the communication device may negotiate parameters of the alternative radio technology with the further communication device. On the basis of the negotiated parameters, the communication device may then establish the D2D communication based on the alternative radio technology.

According to a further embodiment of the invention, a method is provided. According to the method, a node of a cellular network receives, from a communication device, a request for D2D communication. Further, the node sends a response to the request. The response indicating that an alternative radio technology is to be utilized for the D2D communication. The response may further indicate radio resources of the alternative radio technology.

According to an embodiment, the node receives a measurement report concerning the alternative radio technology from the communication device and performs an evaluation of the measurement report. The node may then send the response depending on the evaluation. For example, the evaluation may indicate that certain radio resources, e.g., channels or carriers, of the alternative radio technology are suitable for the D2D communication and the node may indicate these radio resources in the response. Depending on the evaluation, the node may also refrain from indicating in the response that the alternative radio technology is to be used for the D2D communication.

According to an embodiment, the node sends the response depending on a location of the communication device. For example, the node may determine that at the location of the communication device certain radio resources, e.g., channels or carriers, of the alternative radio technology are suitable for the D2D communication and indicate these radio resources in the response. Depending on the location of the communication device, the node may also refrain from indicating in the response that the alternative radio technology is to be used for the D2D communication.

According to an embodiment, the node sends the response depending on capabilities of the communication device. For example, the node may determine that the communication device is capable of utilizing certain radio resources, e.g., channels or carriers, of the alternative radio technology which are suitable for the D2D communication and indicate these radio resources in the response. Depending on the capabilities of the communication device, the node may also refrain from indicating in the response that the alternative radio technology is to be used for the D2D communication.

According to an embodiment, the node sends the response depending on a load of the cellular network. For example, the node may determine that a load of a cell of the cellular network, in which the communication device is located, exceeds a threshold and/or that not enough radio resources of the cellular radio technology are available for the D2D communication. This may trigger sending the response with the indication that the alternative radio technology is to be used for the D2D communication.

According to an embodiment, the node sends the response depending on a preference for the alternative radio technology indicated in the request.

For example, the request may indicate that the communication device prefers establishing the D2D communication on the alternative radio technology. This may trigger sending the response with the indication that the alternative radio technology is to be used for the D2D communication. For example, in evaluations performed by the node, such indicated preference may introduce a bias towards the decision that the alternative radio technology should be used for the D2D communication.

In the above embodiments, the alternative radio technology may be a Wi-Fi Direct technology. Further, the alternative radio technology could be a Bluetooth technology or another ad-hoc networking technology.

The above and further embodiments of the invention will now be described in more detail with reference to the accompanying drawings.

DETAILED DESCRIPTION OF EMBODIMENTS

In the following, concepts according to exemplary embodiments of the invention will be described in more detail. It has to be understood that the following description is given only for the purpose of illustrating the principles of the invention and is not to be taken in a limiting sense. Rather, the scope of the invention is defined only by the appended claims and is not intended to be limited by the exemplary embodiments described hereinafter.

The illustrated embodiments relate to control of D2D communication in a cellular network. In these embodiments, a cellular network based on the LTE technology is assumed. However, it is to be understood that the illustrated concepts may also be applied with respect to other cellular network technologies supporting D2D communication. In the illustrated concepts, D2D traffic may be offloaded to an alternative radio technology, such as WiFi Direct. In this way, for example situations may be addressed in which the cellular network is heavily loaded and sufficient radio resources of the cellular network are not available. By offloading the D2D traffic to the alternative radio technology, more radio resources of the cellular radio technology may be made available for radio communication via the infrastructure of the cellular network, which in turn allows for improving capacity and/or performance of the cellular network.

Figure 1:
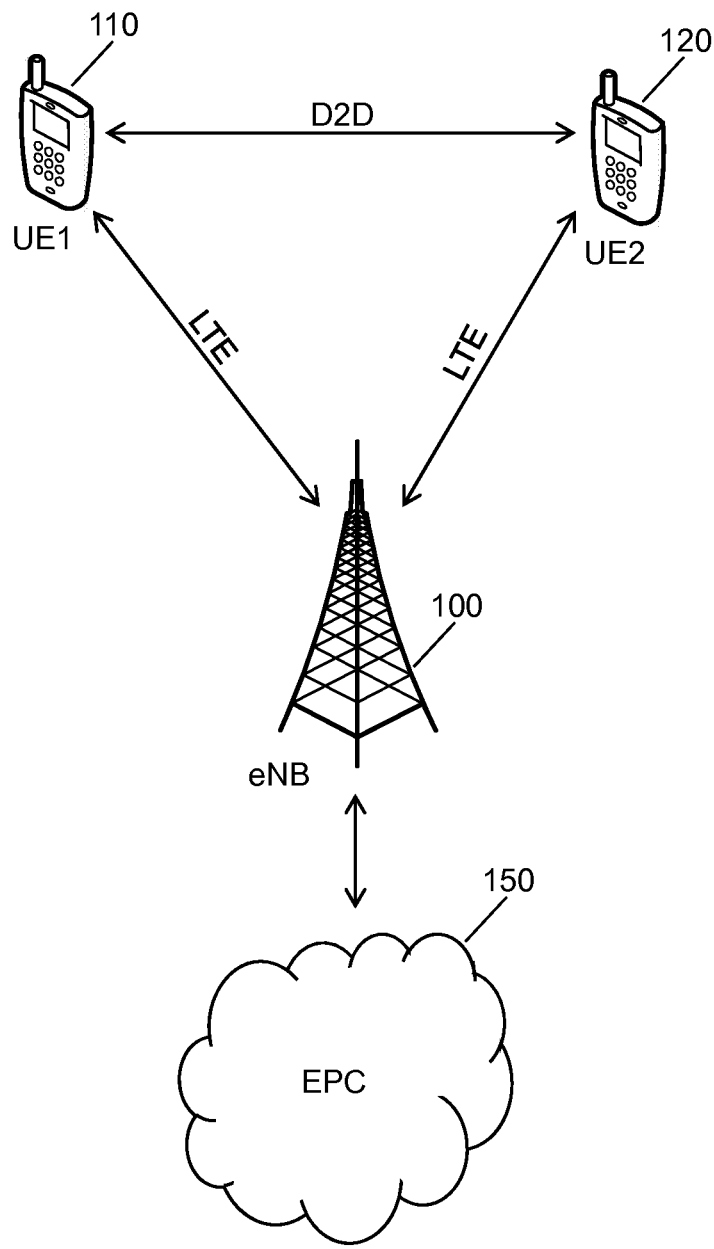
FIG. 1 schematically illustrates an exemplary scenario in which D2D communication is controlled according to an embodiment of the invention.

FIG. 1 schematically illustrates an exemplary scenario in which D2D communication is controlled according to an embodiment of the invention. More specifically, FIG. 1 illustrates a base station 100 of the cellular network, which in accordance with the illustrated LTE implementation is referred to as eNB (evolved Node B). As an example of further infrastructure of the cellular network, FIG. 1 illustrates a core network (CN), which in accordance with the illustrated LTE implementation is referred to as EPC (Evolved Packet Core). Still further, FIG. 1 illustrates a first UE 110 and a second UE 120, which constitute exemplary communication devices for utilization in the cellular network.

As illustrated, each of the UEs 110, 120 may connect to the cellular network by establishing a radio connection based on the cellular network technology. In the illustrated LTE implementation, these radio connections are LTE radio connections based on radio resources from one or more of the LTE frequency bands. In some scenarios, also radio resources from other frequency bands could be utilized. Through the radio connections, the UEs 110, 120 connect to the base station 100 and to the CN 150. This allows for infrastructure mode communication between the first UE 110 and the second UE 120. Further, this allows for infrastructure mode communication with other UEs (not illustrated in FIG. 1) or for utilization of services available through the CN, e.g., IMS (Internet Protocol Multimedia Subsystem) services.

As further illustrated, D2D communication may be established between the first UE 110 and the second UE 120. This D2D communication may utilize the same radio interfaces of the UEs 110, 120 as the infrastructure mode communication with the cellular network. Further, the same radio resources as used for the infrastructure mode communication may be utilized for the D2D communication, e.g., radio resources from one or more of the LTE frequency bands. However, in certain situations, the D2D traffic may be offloaded to the alternative radio technology, e.g., to WiFi Direct. This offloading may be triggered by a corresponding indication to at least one of the UEs 110, 120.

In the following, exemplary processes for implementing the offloading of the LTE D2D traffic to WiFi Direct will be explained in more detail.

In these processes, the UE 110 may request LTE radio resources for D2D communication from the eNB 100. Such request may for example be issued when newly initiating D2D communication between the UEs 110, 120 or during ongoing D2D communication between the UEs 110, 120. The request may also include a measurement report indicating results of a measurement as performed by the UE 110 with respect to the WiFi Direct technology. Such measurement report may for example indicate a discovery beacon, a received signal strength, and/or a pathloss. From such measurement report, the eNB 100 may infer whether a WiFi Direct connection between the UEs 110, 120 can be established. The request may also indicate a preference for using the WiFi Direct technology. The UE 110 may dynamically determine such preference, e.g., on the basis of evaluations of radio measurements concerning the LTE technology and the WiFi direct technology.

In addition, the eNB 100 may check further criteria in order to decide whether the D2D traffic between the UEs 110, 120 should be offloaded to WiFi direct. For example, the eNB 100 may check the load of its LTE radio cell. Further, the eNB 100 could be configured with one or more policies for controlling whether to allow LTE D2D traffic in its cell or not.

If the checks performed by the eNB 100 indicate that LTE D2D communication between the UEs 110, 120 should not be utilized and a WiFi Direct connection is possible, the eNB 100 may respond to the request with a reject message which further indicates that WiFi Direct should be utilized for the D2D communication between the UEs 110, 120. Further, the eNB 100 may also indicate radio resources which may be utilized for the WiFi direct connection, e.g., in terms of one or more WiFi channels. Similarly, the eNB 100 may indicate other parameters for establishing the WiFi Direct connection, e.g., an SSID (Service Set Identifier).

The UE 110 may then evaluate the indicated radio resources and also check its capabilities before taking decision to utilize WiFi Direct for connecting to the UE 120. This may also include performing WiFi Direct initialisation and/or establishment procedures.

If the UE 110 did not provide a measurement report together with the above request, such measurement report may also be provided at a later stage. For example, the UE 110 may send such measurement report upon request by the eNB 100. If the eNB 100 already indicated parameters for the establishment of the WiFi Direct connection, the measurement report may specifically address these parameters, e.g., refer to the indicated radio resources.

For supporting the process of establishing the WiFi Direct connection, the eNB 100 may also indicate LTE radio resources to UE 110, which may be utilized for establishing a temporary LTE D2D connection. Such temporary LTE D2D connection may be utilized by the UEs 110, 120 for negotiating the establishment of the WiFi Direct connection, e.g., by cooperatively selecting one or more WiFi channels. After such negotiation, the temporary LTE D2D connection may be terminated and the D2D communication continued on the negotiated WiFi Direct connection. Alternatively, the UE 110 may directly initiate the D2D communication on the WiFi Direct connection.

As a result, the UEs 110, 120 may establish the D2D communication on the WiFi Direct connection, thereby offloading the D2D traffic from the LTE radio technology to WiFi Direct.

Having successfully established the D2D communication on the WiFi Direct connection, the UE 110 may also indicate to the eNB 100 that the D2D traffic was successfully offloaded. Such indication may be conveyed directly from the UE 110 to the eNB 100 or may be provided indirectly through the EPC 150.

Figure 2:
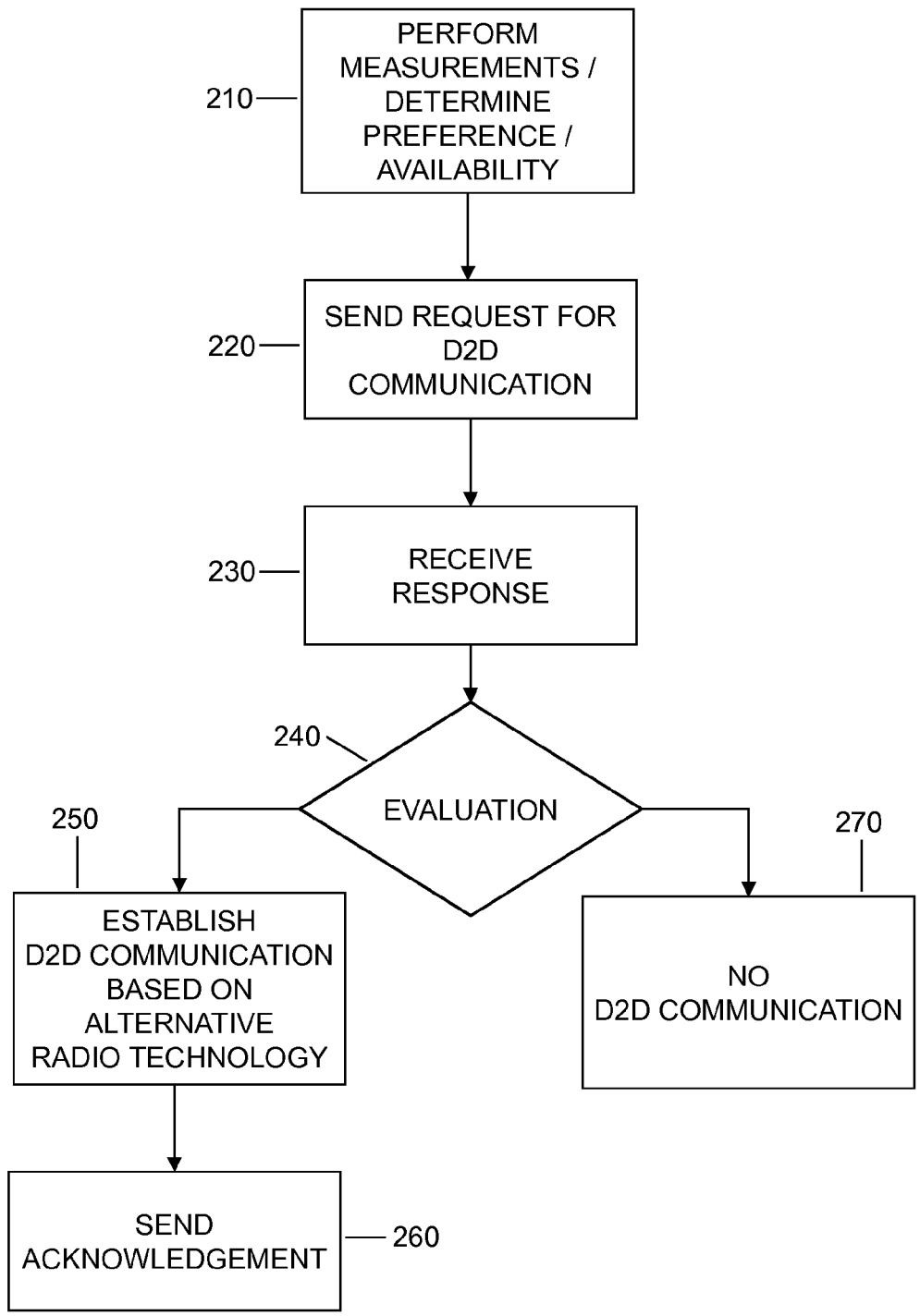
FIG. 2 shows a flowchart for illustrating a method according to an embodiment of the invention.

FIG. 2 shows a flowchart for illustrating a method which may be used for implementing the concepts as outlined above in a communication device, e.g., in one of the UEs 110, 120. If a processor based implementation of the communication device is used, the steps of the method may be performed by a processor of the communication device. For this purpose, the processor may execute correspondingly configured program code. In the method, it is assumed that the communication device is operated in a cellular network based on a cellular radio technology, e.g., the LTE radio technology. In addition, the communication device is assumed to support an alternative radio technology, such as WiFi Direct, Bluetooth, or some other ad-hoc wireless networking technology.

At step 210, the communication device may perform measurements with respect to the alternative radio technology. This may involve discovering peer communication devices located within a coverage range of the alternative radio technology and/or measurement of channel qualities, e.g., in terms of a received signal strength or pathloss.

At step 220, the communication device may send a request for D2D communication to the cellular network. As mentioned above, this request may be sent to a base station of the cellular network, such as the eNB 100. However, the request could also be sent to another node of the cellular network, e.g., a control node in the CN. As mentioned above, the request may have the purpose of requesting radio resources for the D2D communication. However, also other kinds of requests are possible, e.g., a request for authorization of the D2D communication. The request may also include a measurement report indicating a result of the measurements performed at step 210. In some scenarios, such measurement report may also be sent separately from the request, e.g., in response to a measurement request from the cellular network. In some scenarios, the request may also indicate that the communication device prefers D2D communication on the alternative radio technology or that the alternative radio technology is available for use according to a predetermined criteria. The communication device may determine such preference or availability on the basis of the measurements performed at step 210. For example the preference or availability of the alternative radio technology may be indicated only if the measured signal strength exceeds a predetermined threshold level.

At step 230, the communication device receives a response to the request. The response indicates that the alternative radio technology should be used for establishing the D2D communication. The response may also indicate radio resources of the alternative radio technology and/or other parameters to be utilized for establishing D2D communication based on the alternative radio technology. In some implementations, the response may also indicate radio resources of the cellular radio technology, which may be used for establishing temporary D2D communication for negotiation purposes.

At step 240, the communication device may perform an evaluation for deciding whether to use the alternative radio technology for the D2D communication. This may involve evaluation of various criteria. Such criteria may for example involve evaluating radio resources of the alternative radio technology, e.g., whether the radio resources are suitable for establishing the D2D communication. The evaluated radio resources of the alternative radio technology may for example be indicated in the response of step 240. Further, it is possible to evaluate a preconfigured set of radio resources. Alternatively or in addition, the criteria may involve evaluating one or more capabilities of the communication device, e.g., whether the communication device is capable of utilizing the certain radio resources of the alternative radio technology, e.g., as indicated in the response of step 230. The evaluation of step 240 may also involve evaluation of measurements with respect to the cellular radio technology and/or the alternative radio technology. For example, the communication device may use such measurements for estimating channel qualities which can be achieved with the cellular radio technology and the alternative radio technology. The channel qualities may for example be estimated in terms of received signal strength or power or in terms of pathloss. Such channel qualities may then be compared, and the technology offering the better channel quality may be favored in the decision of step 240. The evaluation of step 240 may for example also involve a comparison of channel qualities to threshold values.

If at step 240 the communication device decides to use the alternative radio technology for the D2D communication, the method may continue with step 250.

At step 250, the communication device establishes the D2D communication based on the alternative radio technology. In some scenarios, this may be accomplished by directly setting up a connection based on the alternative radio technology and establishing the D2D communication via this connection. In other scenarios, temporary D2D communication based on the cellular radio technology may be established first, and the communication device may use the temporary D2D communication for negotiating parameters of the alternative radio technology, e.g., radio resources, to be used for establishing the D2D communication based on the alternative radio technology.

At step 260, the communication device may send an acknowledgement to the cellular network to indicate that the D2D communication based to the alternative radio technology was successfully established.

If at step 240 the communication device decides not to use the alternative radio technology for the D2D communication, the method may continue with step 270. In step 270, the communication device may refrain from establishing the D2D communication because neither utilization of the cellular radio technology nor utilization of the alternative radio technology was found to be appropriate for establishing the D2D communication.

Figure 3:
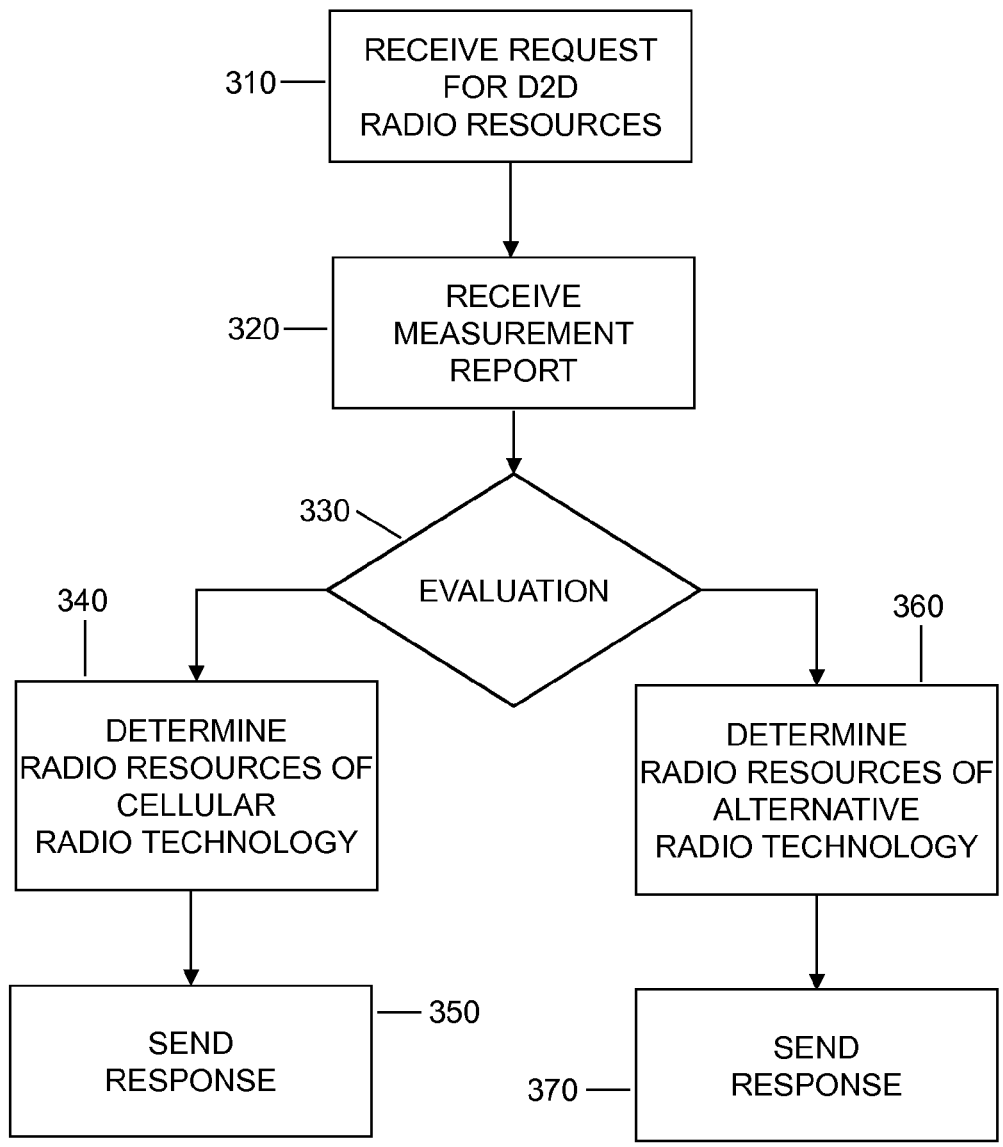
FIG. 3 shows a flowchart for illustrating a further method according to an embodiment of the invention.

FIG. 3 shows a flowchart for illustrating a method which may be used for implementing the concepts as outlined above in a node of a cellular network, e.g., in a base station such as the eNB 100 or in a control node in the CN. If a processor based implementation of the node is used, the steps of the method may be performed by a processor of the node. For this purpose, the processor may execute correspondingly configured program code. In the method, it is assumed that the cellular network is based on a cellular radio technology, e.g., the LTE radio technology, and one or more communication devices operated in the cellular network further support an alternative radio technology, such as WiFi Direct, Bluetooth, or some other ad-hoc wireless networking technology.

At step 310, the node may receive a request for D2D communication from a communication device. As mentioned above, the request may have the purpose of requesting radio resources for the D2D communication. However, also other kinds of requests are possible, e.g., a request for authorization of the D2D communication. The request may also include a measurement report indicating a result of the measurements with respect to the alternative radio technology. Alternatively or in addition, such measurement report from the communication device could also be received separately from the request, e.g., as indicated by step 320.

At step 330, the node may perform an evaluation for deciding whether the alternative radio technology should be used for the D2D communication or not. This evaluation may for example be based on a measurement report with respect to the alternative radio technology, e.g., mentioned in connection with step 310 or 320. For example, the evaluation may indicate whether or not certain radio resources of the alternative radio technology are suitable for the D2D communication.

The evaluation of step 330 may also consider a location of the communication device, e.g., as obtained from a report of the communication device and/or location measurements performed by the cellular network. For example, the node may evaluate whether or not certain radio resources of the alternative radio technology are suitable for the D2D communication at the location of the communication device. The node may also take into account the location of a further communication device to which the D2D communication is intended to be established.

The evaluation of step 330 may also consider capabilities of the communication device. For example, the node may evaluate whether or not the communication device is capable of utilizing certain radio resources which are potentially suitable for the D2D communication.

The evaluation of step 330 may also consider a load of the cellular network. For example, the node may evaluate whether or not a load of a cell of the cellular network, in which the communication device is located, exceeds a threshold and/or whether sufficient radio resources of the cellular radio technology are available for the D2D communication.

The evaluation of step 330 may also consider an indication of a preference of the communication device. Specifically, such indication may indicate that the communication prefers D2D communication on the alternative radio technology. In the evaluation of step 330, such indicated preference of the alternative radio technology may introduce a bias towards deciding that the alternative radio technology should be used. Further, the availability of the alternative radio technology at the communication device may be considered. For example, if it is indicated by the communication device that the alternative radio technology is not be utilized, the node may decide that the alternative radio technology should not be utilized.

If at step 330 the node decides that the alternative radio technology should not be used for the D2D communication, e.g., because sufficient radio resources of the cellular radio technology are available, the method may continue with step 340.

At step 340, the node may determine radio resources of the cellular radio technology and assign these radio resources to the D2D communication by the communication device. At step 350, the node may then send a response to the request of step 310 to allow establishment of the D2D communication based on the cellular radio technology. The response may for example authorize the D2D communication and/or indicate radio resources of the cellular radio technology to be used for establishing the D2D communication based on the cellular radio technology.

The communication device may then proceed with the establishment of the D2D communication based on the cellular radio technology.

If at step 330 the node decides that the alternative radio technology should be used for the D2D communication, e.g., because radio resources of the cellular radio technology are not sufficiently available, the method may continue with step 360.

At step 360, the node may determine radio resources of the cellular radio technology which are suitable for the D2D communication based on the alternative radio technology. For this purpose, the node may also utilize results of the evaluations in connection with at step 330.

At step 370, the node may then send a response to the request of step 310 to allow establishment of the D2D communication based on the alternative radio technology. The response may for example authorize the D2D communication and/or indicate radio resources of the alternative radio technology to be used for establishing the D2D communication based on the cellular radio technology. In some scenarios, the response may also indicate radio resources of the cellular radio technology to be used for establishing temporary D2D communication for negotiation purposes.

The communication device may then proceed with the establishment of the D2D communication based on the alternative radio technology.

It is to be understood that the methods of FIGS. 2 and 3 may also be used in combination, e.g., in a system including one or more communication devices operating according to the method of FIG. 2 and one or more nodes of the cellular network operating according to the method of FIG. 3.

Figure 4:
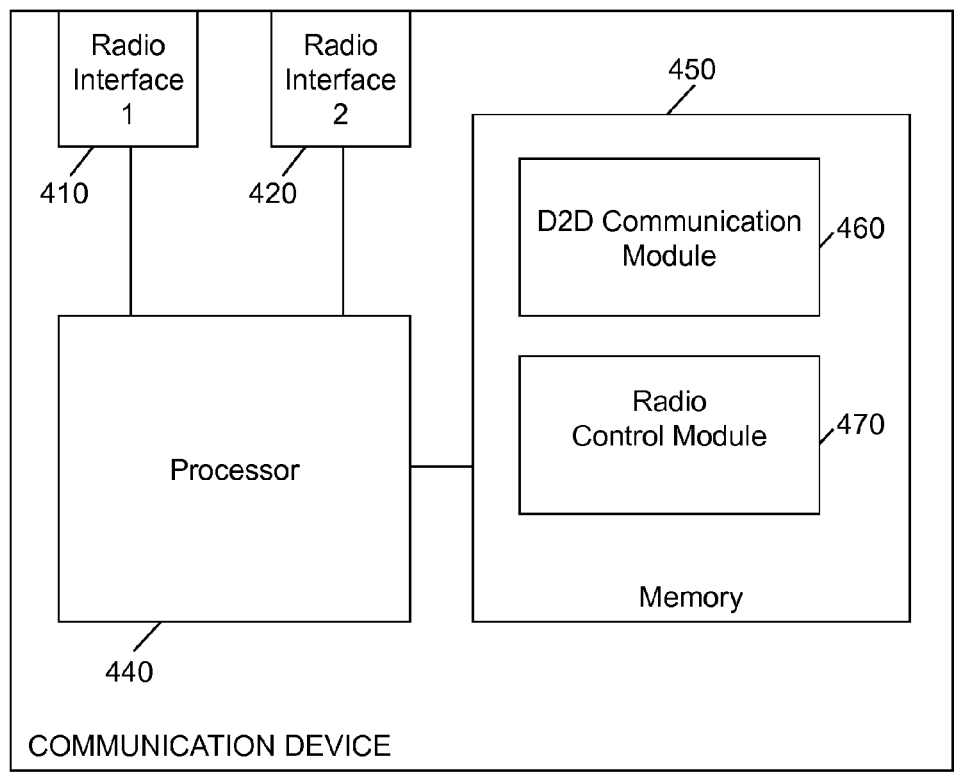
FIG. 4 schematically illustrates structures of a communication device according to an embodiment of the invention.

FIG. 4 schematically illustrates exemplary structures of a communication device which may be used for implementing the above-described concepts. For example, the structures illustrated in FIG. 4 may be used for implementing the UE 110 or 120.

As illustrated, the communication device includes a first radio interface 410 and a second radio interface 420. The first radio interface 410 may be configured to provide connectivity based on a cellular radio technology, such as the above-mentioned LTE radio technology. The second radio interface 420 may be configured to provide connectivity based on an alternative radio technology, such as the above-mentioned WiFi Direct technology or Bluetooth technology. Further, the communication device includes a processor 440 coupled to the radio interfaces 410, 420 and a memory 450 coupled to the processor 440.

The memory 450 includes program code modules 460, 470 with program code to be executed by the processor 440. In the illustrated example, these program code modules include a D2D communication module 460 and a radio control module 470.

The D2D communication module 460 may include program code for implementing functionalities for performing D2D communication. This may for example involve discovery of peer communication devices, establishment of D2D communication, or termination of D2D communication.

The radio control module 470 may include program code for implementing functionalities for selection of a radio technology for the D2D communication and for controlling parameters of the selected radio technology. In particular, the radio control module 470 may implement the decision whether to offload the D2D traffic from the cellular radio technology to the alternative radio technology.

In combination, the D2D communication module 460 and the radio control module 470 may implement functionalities corresponding to the steps of the method of FIG. 2.

It is to be understood that the structures as illustrated in FIG. 4 are merely exemplary and that the communication device may also include other elements which have not been illustrated, e.g., structures or program code modules for implementing known functionalities of a UE, such as a user interface or other communication functionalities, e.g., for infrastructure mode communication using the cellular radio technology or the alternative radio technology. Also, it is to be understood that the detailed implementation of the illustrated structures may vary. For example, the memory 450 may include a read-only-memory (ROM), a random-access memory (RAM), a flash memory, magnetic storage, or the like.

Figure 5:
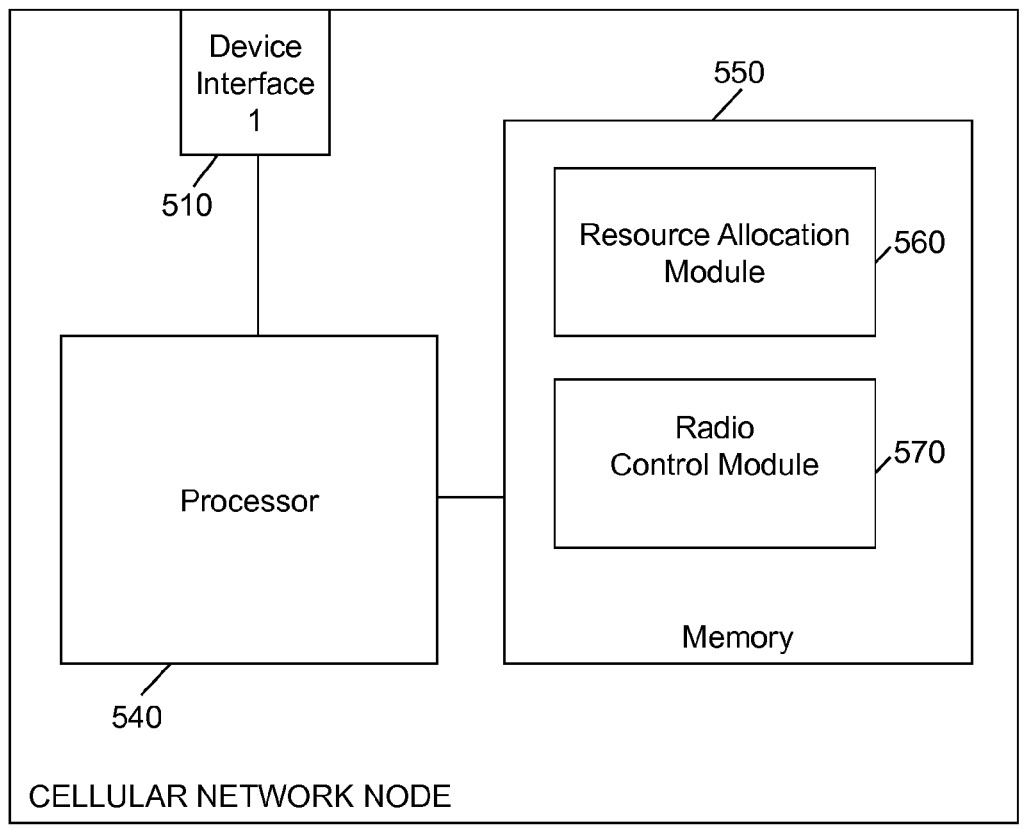
FIG. 5 schematically illustrates structures of a cellular network node according to an embodiment of the invention.

FIG. 5 schematically illustrates exemplary structures of a cellular network node which may be used for implementing the above-described concepts. For example, the structures illustrated in FIG. 5 may be used for implementing the eNB 100 or some other node of the cellular network, such as a control node in the EPC 150.

As illustrated, the cellular network node includes a device interface 510. If the cellular network node corresponds to a base station, such as the eNB 100, the device interface 510 may be implemented as a radio interface based on a cellular radio technology, such as the above-mentioned LTE radio technology. Further, the cellular network node includes a processor 540 coupled to the device interface 510 and a memory 550 coupled to the processor 540.

The memory 550 includes program code modules 560, 570 with program code to be executed by the processor 540. In the illustrated example, these program code modules include a resource allocation module 560 and a radio control module 570.

The resource allocation communication module 560 may include program code for implementing functionalities for selecting radio resources for performing D2D communication, either from radio resources of the cellular radio technology or from radio resources of an alternative radio technology, such as the above-mentioned WiFi Direct technology or Bluetooth technology.

The radio control module 570 may include program code for implementing functionalities for selection of a radio technology for the D2D communication and for controlling parameters of the selected radio technology. In particular, the radio control module 570 may implement the decision whether the D2D traffic should be offloaded from the cellular radio technology to the alternative radio technology.

In combination, the resource allocation module 560 and the radio control module 570 may implement functionalities corresponding to the steps of the method of FIG. 3.

It is to be understood that the structures as illustrated in FIG. 5 are merely exemplary and that the cellular network node may also include other elements which have not been illustrated, e.g., structures or program code modules for implementing known functionalities of a base station, such as an eNB, or of another type of cellular network node, e.g., a control node in the EPC: Also, it is to be understood that the detailed implementation of the illustrated structures may vary. For example, the memory 550 may include a ROM, a RAM, a flash memory, magnetic storage, or the like.

As can be seen, the above-described concepts allow for efficiently handling D2D traffic in a cellular network. Specifically, the D2D traffic may be offloaded from a cellular radio technology to an alternative radio technology, thereby saving resources of the cellular network.

It is to be understood that the concepts as explained above are susceptible to various modifications. For example, the concepts may be applied to various cellular radio technologies supporting D2D communication and to various ad-hoc network technologies.

The invention claimed is:

1. A communication device, comprising:
a first radio interface providing connectivity to a cellular network based on a cellular radio technology;
a second radio interface providing connectivity based on an alternative radio technology; and
a processor,
the processor being configured to:
send, to the cellular network, a request for radio resources of the cellular radio technology to be used for device-to-device communication with a further communication device;
receive a response to the request, the response indicating that the alternative radio technology is to be utilized for the device-to-device communication; and
establish the device-to-device communication on the basis of the alternative radio technology.

2. The communication device according to claim 1, wherein the processor is configured to select radio resources from radio resources of the alternative radio technology indicated in the response and establish the device-to-device communication on the selected radio resources.

3. The communication device according to claim 1, wherein the processor is configured to:
evaluate one or more criteria concerning the alternative radio technology; and
depending on the evaluation, decide whether to perform said establishing of the device-to-device communication on the basis of the alternative radio technology.

4. The communication device according to claim 3, wherein said criteria are based on radio resources of said alternative radio technology.

5. The communication device according to claim 3, wherein said criteria are based on one or more capabilities of the communication device.

6. The communication device according to claim 3, wherein said criteria are based on measurements with respect to at least one of the cellular radio technology and the alternative radio technology.

7. The communication device according to claim 1, wherein the processor is configured to provide a measurement report concerning the alternative radio technology to the cellular network.

8. The communication device according to claim 1, wherein the processor is configured to:
based on the cellular radio technology, establish temporary device-to-device communication with a further communication device;
based on said temporary device-to-device communication, negotiate radio resources of the alternative radio technology with the further communication device and, on the basis of the negotiated parameters, establish the device-to-device communication based on the alternative radio technology.

9. The communication device according to claim 1, wherein the alternative radio technology is a Wi-Fi Direct technology.

10. A node of a cellular network based on a cellular radio technology, the node comprising:

an interface providing connectivity to a communication device; and a processor, the processor being configured to:

receive, from the communication device, a request for radio resources of the cellular radio technology to be used for device-to-device communication with a further communication device; and send a response to the request, the response indicating that an alternative radio technology is to be utilized for the device-to-device communication.

11. The node according to claim 10, wherein the response further indicates radio resources of the alternative radio technology.

12. The node according to claim 10, wherein the processor is configured to:

receive a measurement report concerning the alternative radio technology from the communication device;

perform an evaluation of the measurement report; and send the response depending on the evaluation.

13. The node according to claim 10, wherein the processor is configured to send the response depending on a location of the communication device.

14. The node according to claim 10, wherein the node is configured to send the response depending on capabilities of the communication device.

15. The node according to claim 10, wherein the node is configured to send the response depending on a load of the cellular network.

16. The node according to claim 10, wherein the alternative radio technology is a Wi-Fi Direct technology.

17. A method, comprising:

a communication device sending, to a cellular network based on a cellular radio technology, a request for radio resources of the cellular radio technology to be used for device-to-device communication with a further communication device;

the communication device receiving a response to the request, the response indicating that an alternative radio technology is to be utilized for the device-to-device communication; and the communication device establishing the device-to-device communication on the basis of the alternative radio technology.

18. The method according to claim 17, wherein the alternative radio technology is a Wi-Fi Direct technology.

19. A method, comprising:

a node of a cellular network receiving, from a communication device, a request for radio resources of the cellular radio technology to be used for device-to-device communication with a further communication device; and the node sending a response to the request, the response indicating an alternative radio technology to be utilized for the device-to-device communication.

20. The method according to claim 19, wherein the alternative radio technology is a Wi-Fi Direct technology.

\* \* \* \* \*